United States Patent [19]

Hofmann et al.

[11] 4,347,511
[45] Aug. 31, 1982

[54] PRECISION NAVIGATION APPARATUS

[75] Inventors: Otto Hofmann, Kirchstockach; Walter Kroy, Ottobrunn; Peter Nave, Hohenbrunn, all of Fed. Rep. of Germany

[73] Assignee: Messerschmitt-Bölkow-Blohm Gesellschaft mit beschrankter Haftung, Munich, Fed. Rep. of Germany

[21] Appl. No.: 135,898

[22] Filed: Mar. 31, 1980

[30] Foreign Application Priority Data

Apr. 11, 1979 [DE] Fed. Rep. of Germany ....... 2914693

[51] Int. Cl.³ .............................................. G01S 13/89
[52] U.S. Cl. ............................ 343/5 PC; 343/5 MM; 343/9 PS
[58] Field of Search ............... 343/5 MM, 5 PC, 9 PS

[56] References Cited

U.S. PATENT DOCUMENTS

| | | | |
|---|---|---|---|
| 2,824,271 | 2/1958 | Anderson et al. | 343/5 PC |
| 3,071,765 | 1/1963 | Schutz | 343/5 MM X |
| 3,191,170 | 6/1965 | Lustig et al. | 343/5 PC |
| 3,435,452 | 3/1969 | Kilpatrick | 343/6 R |
| 3,614,035 | 10/1971 | Buynak et al. | 343/5 MM X |
| 3,742,495 | 6/1973 | Diamantides | 343/5 MM |

Primary Examiner—Malcolm F. Hubler
Attorney, Agent, or Firm—Toren, McGeady & Stanger

[57] ABSTRACT

In the disclosed apparatus, a reference image sensor continuously scans a filmed atlas of images representing terrain being overflown while a second sensor simultaneously scans the terrain. A correlator compares the signal and the reference image sensor describes a course, corresponding to that of the flying body, over the film, in response to control signals based upon the correlation results. The reference image sensor reads only the area of the film around the course.

12 Claims, 7 Drawing Figures

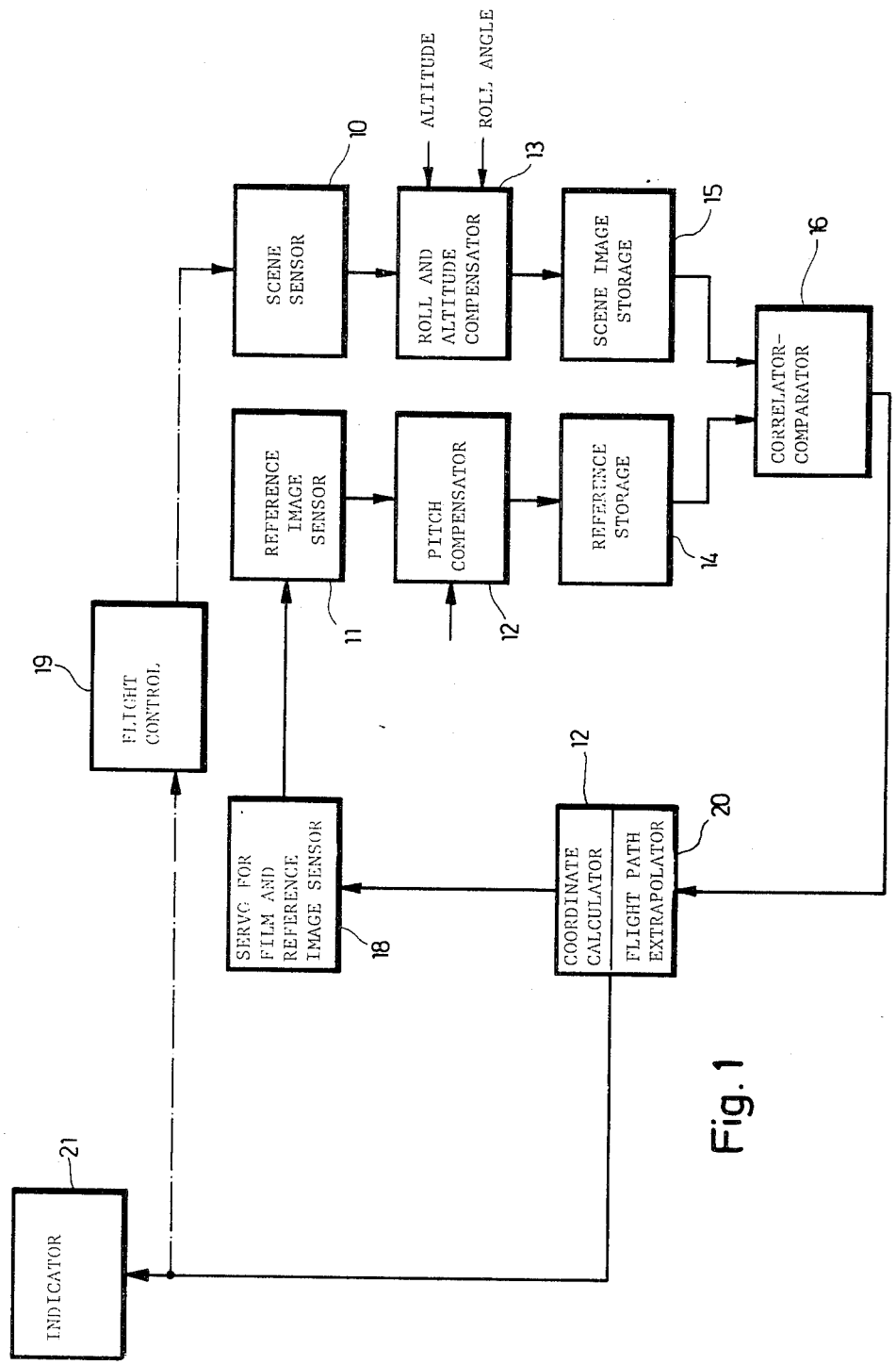

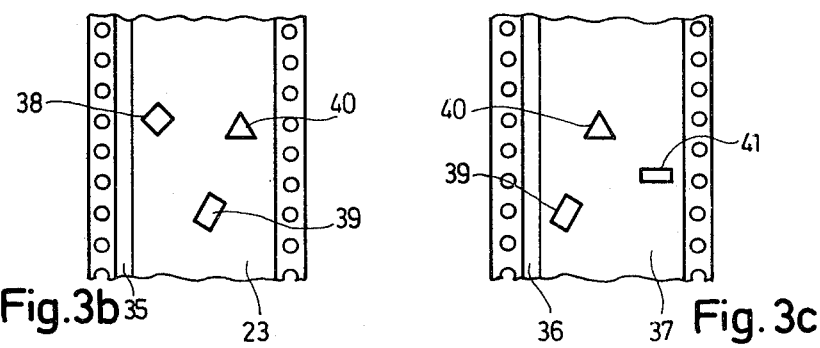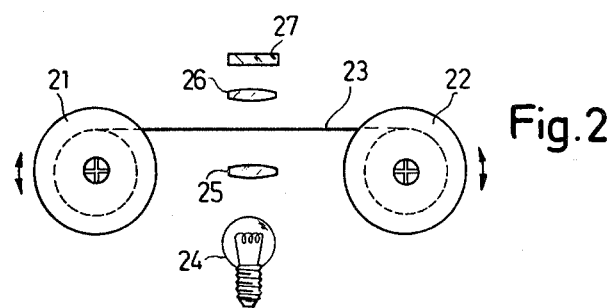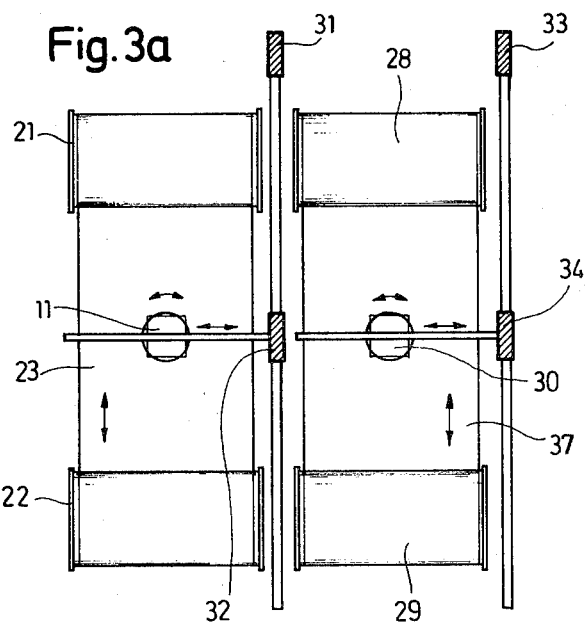

PATH OF THE REFERENCE IMAGE
SENSOR 11 ACROSS THE FILM
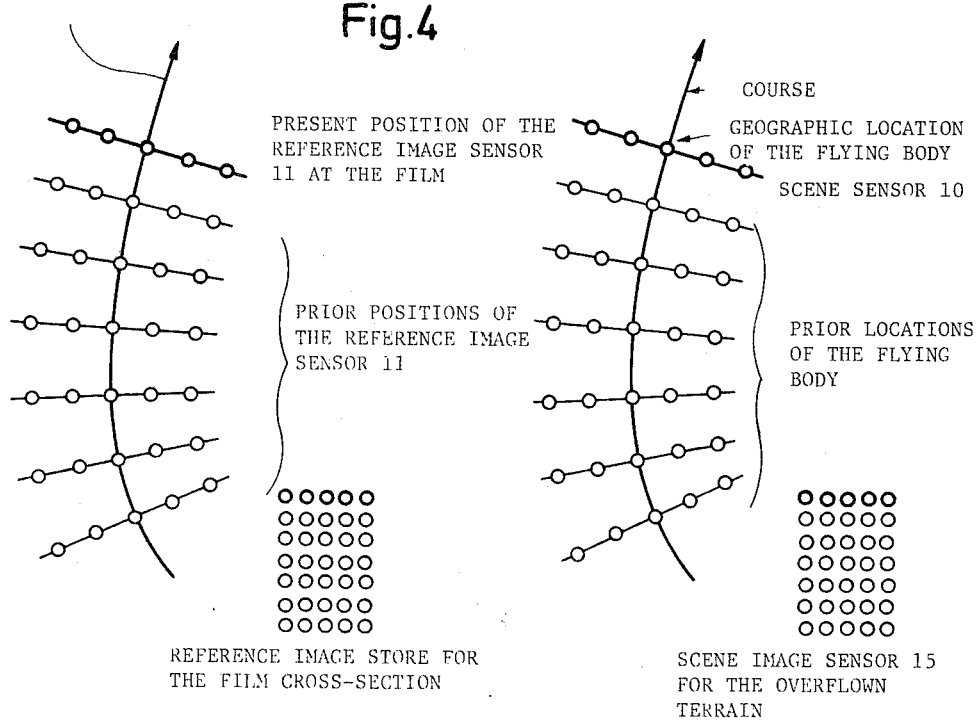
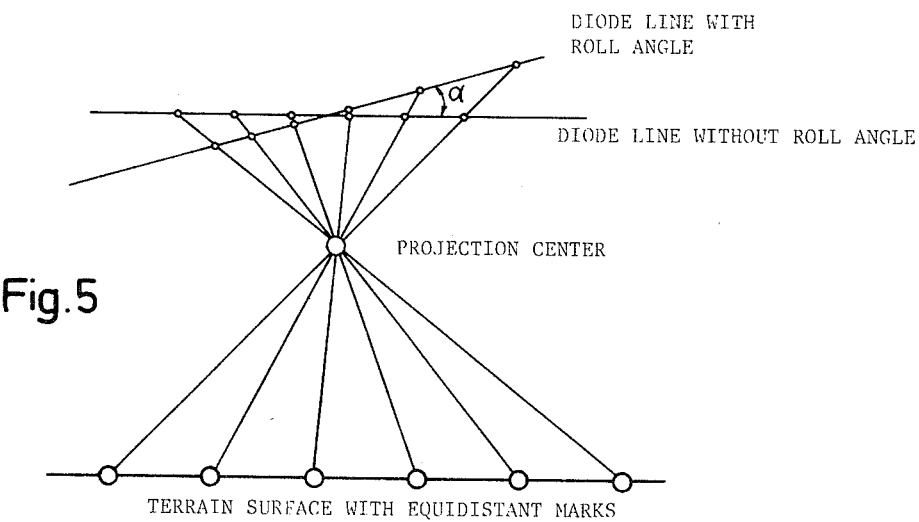

PRECISION NAVIGATION APPARATUS

BACKGROUND OF THE INVENTION

This invention relates to precision navigation devices, and particularly, to devices which compare a reference image with a scene of terrain being overflown by manned or unmanned flying bodies, e.g. aircraft.

Precision navigation devices with image comparison are known. In the underlying process used in such devices, the so-called comparison navigation process, comparison is made between the terrain scanned at the time it is flown over and a previously recorded reference image.

U.S. Pat. No. 2,526,682 discloses a flight indicator in which radar installed in the aircraft surveys the overflown terrain. The terrain is displayed on a cathode-ray tube. At the same time, a projector projects a previously taken film of the terrain on a translucent projection screen on whose other side the projection screen of the cathode-ray tube is arranged. An optical lens projects the image of the cathode-ray tube on the projection screen in the correct position so that an observor can see both images on the projection screen. Conclusions can be reached about the altitude of the aircraft, and its speed above ground, as well as its position, from the deviation between the images.

U.S. Pat. No. 3,103,008 discloses a similar device. The projection screen displays an actual positive of the overflown terrain. The image can be made by radar, and infrared conversion, or any photographic positive. A previously taken negative reference image of the terrain is arranged parallel to the positive. After this, an optical lens and a following photocell are arranged to scan both images synchronously. Servomotors adjust the images on the basis of the scanning results until a maximum correlation is achieved. The deviations permit determination of the position of the aircraft in relation to the reference image.

Another apparatus and method of this type is shown in "Aviation Week", June 23, 1958, page 53. Here, actual scenes of the terrain are scanned by radar and compared with photographic reference images. These are carried along and constitute an atlas of images on the film.

U.S. Pat. No. 3,163,098 discloses a device in which a camera continuously photographs the overflown terrain. The terrain lying ahead of the flight is sensed and compared with a stored image of the same terrain after it has been overflown. The comparison is combined with other factors to influence control of the aircraft.

"Aviation Week & Space Technology", Feb. 25, 1974, page 50, ff, discloses the Tercom process. In the latter, barometric measuring devices and radio altimeters produce altitude profiles during specific time intervals of a flight over characteristic terrain. The one-dimensional differential profile between the barometric altitude and altitude above ground is compared with a two-dimensional reference profile. Here, the measured altitude profile is adjusted until the best correlation is achieved, so that the exact position of the aircraft results.

Another procedure is disclosed in "Aviation Week & Space Technology", Apr. 5, 1976, pages 39 etc. Here, the chharacteristic radiation of different materials in the microwave range is utilized. At given intervals, a microwave radiometer measures the characteristic radiation temperatures of the overflown terrain at given intervals. Maps which show only steps in the radiation temperature are used as a reference. These are produced from multispectral satellite photographs taken at corresponding seasons of the year.

An object of the present invention is to improve precision navigation devices.

Another object of the invention is to produce a device of the type described above which makes possible a continuous comparison of the overflown terrain with a minimum number of devices, and in which the data to be handled are limited to the necessary minimum.

SUMMARY OF THE INVENTION

According to a feature of the invention, these objects are attained, in whole or in part, by carrying a filmed atlas of images of the terrain to be overflown, continuously scanning the film with a movable reference image sensor and simultaneously scanning the overflown terrain with a scene sensor, comparing the scanned values with each other, utilizing control signals from the comparison to describe a film-related course which corresponds to the course of the flying body above the terrain, and making the reference image sensor read only the area of the film around the mapped course.

In contrast to known procedures and devices, the terrain as well as the film are scanned simultaneously by independent sensors and correlation is performed on the basis of these scans. By guiding the reference image sensor along the course of the aircraft or flying body, it is possible to limit the necessary data considerably. Hence, the requirements for software and hardware are much less than in known processes. This reduction in the amount of data obtained is also a prerequisite for rapid processing with an on-board computer and consequently for continuous evaluation of the scanning values of the overflow terrain. The actual data on the terrain and those stored on the film are so similar in character and organization that their analogous scanning permits immediate comparison.

These and other features of the invention are pointed out in the claims. Other objects and advantages of the invention will be evident from the following detailed description when read in light of the accompanying drawings.

BRIEF DESCRIPTION OF THE DRAWINGS

In the drawings:

FIG. 1 is a block diagram of a precision navigation apparatus embodying features of the invention.

FIG. 2 is a film-feeding arrangement utilizing a reading head and illumination device for use in the system of FIG. 1.

FIG. 3a illustrates two adjacent reading arrangements corresponding to that of FIG. 2.

FIGS. 3b and 3c illustrate film portions of the devices in FIG. 3a.

FIG. 4 is a graph illustrating scanning along an actual flight course and scanning along a film.

FIG. 5 is a graph of geometric ratios during roll motion of the aircraft.

DESCRIPTION OF PREFERRED EMBODIMENTS

According to an essential feature of the device, reference image data stored on film strips and a section of the terrain flown over by the aircraft are separately but simultaneously and continuously scanned by optical or optoelectronic means, the scanning results are correlated with each other, and the reference image sensor scanning the reference image is guided continuously to correspond to the course of the aircraft.

The terrain and the film are scanned digitally by a scene sensor 10 and a reference image sensor 11, to be further described. The correlation results guide the reference image sensor 11 continuously over the film along a path which corresponds to the course of the flying body over the landscape. The instantaneous location of a flying body is calculated and registered with a coordinate computer based on the sensor position. Hence, the film or reference sensor coordinates are in a known relation to the terrain coordinates (e.g., Gauss-Krüger or UTM coordinates system) and, therefore, the actual position of the flying body in the terrain is always known. The coordinates can inform the pilot or ground station of the location of a flying body. On the other hand, the coordinates can also be additionally used, in further computations in comparison with reference course data so as to give automatic control orders to the control device of the flying body.

According to FIG. 1, a device for precision navigation is composed of a scene sensor 10, a compensator 13 for roll and vertical movements of the flying body, a scene-image storage or storage device 15, a reference image sensor 11 for scanning of the film taken along, a compensator 12 for compensating for the pitch of the flying body, a reference image storage or storage device 14, a correlator or comparator 16, a coordinate computer 17 and a servo 18 for guidance of the reference image sensor 11.

Reference image data may be produced as follows:

The film brought in the flying body contains information concerning the terrain over which the aircraft is to fly, and this information is in the form of an atlas of images. The information may be, for instance, in the form of aerial photographs, which were produced in the visible or infrared range of the optical spectrum. In preparing the film, the images are specially processed so that the comparison between the film image and the actual landscape scene is possible during all seasons of the year, that is when the ground is or is not covered with snow, and under different light conditions (evening sun, through fog layers, etc.). This preparation for example, involves emphasizing the invariant characteristics of the landscape and suppressing the variable characteristics. This is accomplished in aerial photographs by emphasizing the edges and outlines, and by showing the flat surfaces in a uniform gray tone. Processes to accomplish this, such as single or multiple differentiation, local digital filtering etc. are known; see Rosenfeld and A. C. Kak, "Digital Picture Processing", Academic Press 1976.

In another embodiment, the film images are made continuously compatible with signals from a terrain being overflown by the use of parts of the electromagnetic spectrum that are as insensitive as possible to clouds, fog, snow and light situations. Examples of systems using such means are: Radar, especially the so-called "side-looking" radar which, as known, supplies relief image photographs of the landscape flown over, see also German Auslegeschrift No. 25 43 312; Altitude radar (Höhenradar) is another example which, as known, supplies maps of the vertical profile of a landscape. In this case, the film contains suitable coded information on ground elevations, so that a registered gray value of an image point can represent the elevation of a landscape point.

The invention also contemplates using the characteristic radiation of objects in the landscape. It is known that houses and rivers stand out from their environment due to infrared radiation. (See S. Schneider, "Luftbild und Luftbildinterpretation" meaning: Aerial Photographs and Interpretation of Aerial Photographs; De Gruyter, 1974). The contrasts that can be achieved are sufficient for the intended navigation task.

According to an embodiment of the invention, the certainty of again finding a location on the film is increased by storing an additional type of information. In one example, information on infrared images is stored on the film together with altitude information, differentiated by digital or color identification. In another example, information may relate to the terrestrial magnetic field and the terrestrial magnetic field vector is recorded as a function of the geographic coordinates.

The common characteristic of all types of information stored for the performance of navigational tasks is the area two-dimensional arrangement of information on a film. The greatest possible information density on a thin-emulsion film, for instance, Agfa-Gevaert, Agfa-Ortho-25-Professional, is computed as follows: Image points of 5 $\mu$m diameter and differentiation of 256 gray shades per image point produce an information density of about $1.10^9$ Bit/cm$^2$. This results in a very compact film spool. The recording of the terrain of the size of the entire Federal Republic of Germany on film at a ground resolution of 1 m requires storage of about 250 billion image points. At the specified film point size and a usable film width of 60 mm—the starting material is 70 mm wide perforated professional film—meaning that about 100 m of film are required. Taking into consideration the fact that according to the invention, each landscape point is recorded approximately twice (see below), the amount to be taken along is 2 film spools, each 70 mm wide, with a diameter of 170 mm, a total volume of only about 3.2 Liters.

In conventional recording on magnetic tape, for instance, high density digital tape with about 0.7 Megabit per inch and 1 inch width (Ampex), at a tape thickness of 29 $\mu$m, recording the same data requires about 50 Liters for a single recording. Also, the problem of moving transversely to the terrain strip stored on the tape has not been solved.

The large amounts of data available are compared with the landscape actually seen by the scene sensor 10. This takes place in a digital correlator 16. The amount of data to be processed is limited so that the electronic hardware does not become too extensive and too slow. According to the invention, this restriction takes place because, on the film, only a small area located around the map course is read. In this way, only the directly relevant amounts of data reaches the correlator 16. Therefore, the data storage necessary in the correlator is kept small.

The reference image sensor 11, which optically reads the part of the film that is to be entered in the correlator 16, moves relative to the film over a course which corresponds to the path of the body flying over the landscape. This course is determined by the immediate past location of the flying body, as well as by the course section extrapolated into the future. This extrapolation occurs in the on-board computer on the basis of known course elements by using generally known linear, quadratic, or higher curve extrapolation.

The reference image sensor 11 includes illumination equipment, composed of a lamp 24 and a lens arrangement 25, (see FIG. 2), which illuminates the film copy which transmits the light using the principle of microscope illumination. (See Born and Wolf, "Principles of Optics", Macmillan 1959.) An optical system 26, in view of the high detail density of the film, is preferably composed of a precision microscope objective. In principle, according to the invention, any electrooptical device which converts the optical signals into electrical signals is suitable as a sensor. However, a preferred embodiment uses a photodiode line 27 in which many photodiodes are arranged linearly next to each other, whereby an entire line of an image can be read almost simultaneously. Examples of such photodiode lines are the CCD121 of Fairchild as well as CCPD-1728 of Reticon, in California. The photodiode line 27 is built into the reference image sensor 11 and the sensor 11 moves over the film, so that the axis of the line forms a right angle with the curve of the course. The data according to which this movement is performed are calculated on the on-board computer in a manner still to be described.

The movement of the reference image sensor 11 over the film is basically mechanical. Relative movement of the reference image sensor and the film is possible with three degrees of freedom: Two translational motions, that is longitudinally of the film and transverse to the film, and rotation of the reference image sensor about an axis perpendicular to the film surface. Due to the rotation, it is possible to place the photodiode line transverse to the course.

A number of embodiments may be used for the performance of the motions. According to a preferred embodiment, the motion longitudinal to the film direction is accomplished by spooling the film forward and backward. The receiving spool 21, 22 is always driven by an electric motor, e.g., a stepping motor, while the delivering spool 21, 22 is braked such as by a mechanical or solenoid brake. These stepping motors or brakes are activated by the on-board computer in a manner to be described. The reference image sensor 11 is moved transverse to the film direction by known means using linear kinematics, such as a slide on a rail driven by motors, preferably stepping motors, as used in electronic measuring devices and so-called page printers (example: Mosley 7100 BM of Hewlett-Packard). According to an embodiment, potentiometers or optical decoders feed the linear and rotating motions back to the on-board computer. If movement of the reference image sensor 11 relative to the longitudinal direction of the film is achieved by means of the film spools, the feedback of the position, according to one embodiment is accomplished by the available scale division necessary on the film, which scale division preferably is available as an optical code. The scale division is read by a suitable reading device, such as a line of photodiodes.

The data originating from the reference image sensor 11, which correspond to the rectilinear scanning of the film, are intermediately stored in a Random Access Memory (RAM) reference image storage or register 14. The photodiode line 27 is read by sequentially detecting the outputs of the individual photodiodes. The photo signals are stored in the reference image storage 14 in this timed sequence. At each cycle, the content of the film image storage 14 is shifted down one line as shown in FIG. 4. The line "falling out" at the bottom is disregarded, while the line which becomes free at the top detects the latest signal from the photodiode line 27. In this way, the reference image storage 14 contains only that part of the stored film information which is concentrated over the film around the location of the reference image sensor 11. If the correlation was successful, so far, then this location of the reference image sensor relative to the film also corresponds to the location of the flying body relative to the landscape.

The actual scene detected by the scene sensor 10 is stored in a scene image storage 15, which basically is organized in the same way as the above-described reference image storage 14. It receives its information from the scene sensor 10 which "sees" the landscape flown over. Preferably, here too, the image is picked up line by line. This scanning of the landscape image line by line corresponds to the operation of side-looking-radar, infrared scanners, optical diode lines and picture tubes, which function like a television picture tube. The axis of the scanning line of the scene sensor 10 is maintained in a plane at right angles to the axis of the flying body. Hence, similar to the reference image sensor 11, the line axis is perpendicular to the flight course. According to another embodiment, a control device sets the scene sensor cell perpendicular to the actual flight course and not to the body axis. This is necessary when both directions differ greatly from each other, such as during drift due to crosswind. This is made possible by an on-board electric signal that measures the magnitude of the drift.

To balance out rolling movement of the flying body, as they occur during turns, and of pitch movements occurring during climbing flight and descending flight, the scene sensor 10 is connected to a control system which receives position signals from an appropriate instrument on board, such as an absolute inclinometer. The output signals of the latter which correspond to the difference of the flying body position and the horizon, hold the scene sensor line parallel to the horizon level by means of servomotors independent of the momentary flying body position.

According to another embodiment of the invention, control of the scene sensor position, rather than being accomplished mechanically is achieved electronically. The roll angle $\alpha$ is compensated for the course in the path between the sensor 10 and the image storage 15 (see FIG. 5). In this figure, the relevant geometry is shown greatly simplified and exaggerated in order to make it easier to understand. The surface of the paper represents a plane through the landscape and the flying body transverse to the flying direction. Lines from equidistant points on the landscape surface are depicted as passing through a projection center and to the sensor line. In an optical device, the projection center is the objective, in the case of radar, it is the center of curvature of the reflector on the sensor line. If this sensor line is tilted due to rolling motion of the flying body, then the landscape points are not depicted equidistantly. However, at a known rolling angle $\alpha$, very simple geometric calculations can convert the distance y of a point image from the center point of the tilted sensor line to a value x which corresponds to the position of a non-rolling sensor. This is done by the equation $$x = r \tan(\arctan(y/r) - \alpha)$$

wherein r is the focal length of the objective. The aforementioned equation can easily be used in the on-board computer.

The pitching movements can be compensated for in a similarly simple way. For instance, the scene sensor 10 looks further ahead during climbing than during horizontal flight. The reference image sensor 11 is correspondingly held over the film plane, that is, it will hurry ahead of the position corresponding to the geographic position over the film. During calculation of the reference position of the reference image sensor, the on-board computer utilizes the roll angle. However, the latter must be available as an electrical signal aboard the flying body or aircraft.

If the aircraft flies along a curved path, then the scene sensor 10 no longer scans a rectangular terrain, but a curved terrain, which look approximately like a section of an annulus, as shown in FIG. 4. This fan-shaped succession of lines, as shown in the figure, is stored in the rectangular scene image storage 15. Hence, the landscape image is distorted. However, this does not make the comparison or correlation more difficult because the reference image sensor 11 simultaneously travels over the film along a geometrically similar course which effects the same distortion of the film image section. Therefore, compensation for the distortion is unnecessary.

The scale of the landscape on the sensor plane depends on the altitude of the flying body. In order that the scene image reaches the scene image storage 15 at the same scale at which the film image is stored in its reference image storage 14, the scale of the scene sensor 10 is adjusted to the altitude. This is achieved either mechanically or electronically. In both cases, the information pertaining to the altitude is made available on board in electrically utilizable form. Such altitude information may come either from active systems, such as altitude radar or laser-radar, or it may originate passively from barometric measurements of the air pressure or from optical correlation methods disclosed in U.S. Pat. No. 3,163,098.

A mechanical change of the scale involves, for instance, changing the focal length of the photographic optics 26. A known zoom-objective of variable focal length serves this purpose. A servomotor adjusts the focal length of the objective. The servomotor receives its signals from the signal representing the altitude.

According to another embodiment, the altitude compensation is performed electronically by converting the position coordinate of an image point with regard to the center point of the sensor line. If one identifies the focal length of the objective as r, the flight altitude as H, the reference flight altitude which corresponds to the film scale as $H_o$, and the uncorrected position of the image point as y, then the corrected image point location x is given by:

$$x = \frac{H_o r^2}{H y}.$$

This is derived from simple geometric consideration. This equation can be simply used for compensation by the on-board computer.

In summary, the compensation is achieved mechanically as well as mathematically/electronically. Conversion of the image signals takes place best between the sensors 10, 11 and the image storages 14, 15 in the compensation devices 12, 13. The aforementioned correction methods act on the target address of an image point signal in the image storage. If the image content is expanded, then the image storage elements can and will remain unoccupied. These image storage elements are received from the computer with an image value, which corresponds, for instance, to the arithmatic mean between the two neighboring points. Other than linear forms of interpolation can also be used. When the image content is compressed, image points are eliminated. It can be seen that in an "elimination strategy", the extreme values of competing image points are maintained, while the median values are eliminated.

Before the correlation between the reference image storage 14 and the scene image storage 15 is performed, the images in the scene image storage 15 are processed to eliminate characteristics which fluctuate depending on the time of day and season and to emphasize the characteristics constant in time. This is accomplished by processes which increase the contrast and straightening procedures. Such procedures are also disclosed by A. Rosenfeld and A. C. Kak in "Digital Picture Processing", Academic Press 1976.

To explain the correlation process, it should be noted that the scene image storage or storage device has I-lines and J-columns, while the storage for film image sections have F-lines and G-columns, wherein F is larger than I and G is larger than J. The correlations matrix has $M=F-I+1$ lines and $N=G-J+1$ columns. The designation $x_{ij}$ is for the content of the matrix element of the film image storage which occurs at the intersection of the $i^{th}$ line with the $j^{th}$ column, and $y_{ij}$ for the corresponding image element in the scene storage. Hence, the m, n-$^{th}$ element of the correlation matrix K is given by:

$$k_{mn} = \frac{\sum\limits_{i}^{I}\sum\limits_{j}^{J}(x_{ij}-\bar{x})(y_{i-m,j-n}-\bar{y})}{\sqrt{\sum\limits_{i}^{I}\sum\limits_{j}^{J}(x_{ij}-\bar{x})^2 \sum\limits_{i}^{I}\sum\limits_{j}^{J}(y_{ij}-\bar{y})^2}}$$

$$\frac{M}{2} \leq m \leq \frac{M}{2}, \ -\frac{N}{2} \leq n \leq \frac{N}{2}.$$

The subscripts i, j of an image point $y_{i,j}$ in the film section storage correspond to coordinates relative to the estimated location of the flying body in the film images. Characters $\bar{x}$ and $\bar{y}$ signify arithmatic average values. Of all m×n K-values, a K value will be the maximum. The appropriate subscripts are identified as m+ and n+. $K_{m+, n+}$ are identified as correlation maximum. If the scene image exactly corresponds to the film image, then m+ =0 and n+ =0. When the scene image is shifted relative to the film image, then m+, n+ ≠ 0 occurs. Consequently, m+, n+ is the error between the actual location of the flying body and the location of the reference image sensor 11 over the film. Since the latter is known from the film border code and the code of the linear Kinematics, which moves the reference image sensor 11, the actual location of the flying body in the film image can be calculated. From several chronologically determined actual locations, it is possible to determine the curve of the course along which the reference image sensor is guided over the film in the described manner by means of curve fitting, e.g. by adapting a conic section. At the beginning of the flight, the reference image sensor is brought to its beginning location and the direction of its beginning movement and speed are fed in.

As already described above, the actual location of the flying body is known from film coding etc. The result can be included to give the pilot information about his location in the usual manner, or to give it as an optical image for the film in an indicator 21, or as an additional calculation in comparison with the specified data on the desired course, it can furnish automatic control orders to the flight control 19 of the flying body.

As mentioned, the navigation system permits storage of the smallest detail of information about the terrain to be flown over. As an example, 1 m$^2$ was mentioned as the smallest ground area to be resolved. With this, and in combination with the described distortion correction, it is also possible to navigate in the manner described during low-level flight below 500 m.

FIGS. 3a, 3b, and 3c illustrate the uninterrupted transition from one map section to an adjacent section. It is necessary to spool the film 23 further when the reference image sensor 11 reaches one of the four edges of the present film gate. There is no problem when reaching the edges which join the receiving or delivery spool 21, 22. After simply spooling the film 23 further, the reference image sensor 11 can continue its activity without interruption.

However, if the reference image sensor 11 contacts one of the two cut edges of the film, then the reading must be interrupted until the film gate can be brought up with the adjacent map.

This difficulty is prevented, according to the invention, by providing a second pair of film spools 28, 29 with the film 37 whose image content in part overlaps with that of the first film 23. A second reference image sensor 30 is also available. If the first reference image sensor 11 now comes close to the edge of the first film 23, then the adjacent map section is brought up on the second film 37, and the second reference image sensor 30 can undertake the reading of the film 37. In this way, uninterrupted transitions are possible even in courses transverse to the film strips.

To make the achievement of the uninterrupted transition from one map section to the adjacent section clearer, two film sections are shown in FIGS. 3b and 3c. Here, lines 35 and 36 on films 23 and 37 serve to receive the position codes. Schematically shown landscape points 38 to 41 form part of the image content of the two films 23 and 37 which overlap in part. The overlap is evident from the presence of the two objectives 39 and 40. If, for example, the reference image sensor 11 now reaches the right edge of film 23, and if, at the same time, the course computer of the flying body predicts a course crossing the film edge, then the film 37 is spooled in proper time into the accessibility range of the second reference image sensor 30, and then this sensor can undertake the further scanning of the film 37. This procedure occurs in the logically reverse sequence when the sensor 30 comes too close to the left edge of the film 37. Of course, all edge transitions on both films are guided without interruptions by having an appropriate arrangement of the individual parts of the atlas of film images.

The reference image sensors 11, 30 are attached to mechanical position arms 31, 32 or 33, 34, wherein adjustment feedback is accomplished by servomotors etc.

While embodiments of the invention have been described in detail, it will be evident to those skilled in the art that the invention may be embodied otherwise without departing from its spirit and scope.

What is claimed is:

1. A device for image-correlation precision navigation of bodies flying over terrain comprising: a plurality of reference images of the terrain to be flown over, said images each having a given width, a scene sensor for scanning the terrain flown over and producing values corresponding to the scenes scanned, a reference image sensor for continuously and simultaneously scanning the reference images corresponding to the terrain scanned by the scene sensor and producing values corresponding to the reference images, comparator means for comparing the values of the scanned reference images and scene with each other, feedback means responsive to said comparator for shifting the scanning of said reference image sensor along a course over said reference images based on the comparison of said comparator means so that the course corresponds to that of the body flying over the terrain, said reference image sensor having means for scanning only the area of said film over a range less than the widths of the images around the map course and said feedback means having means for shifting the range along the widths of the images.

2. A device as in claim 1, wherein said images are formed on a film and positioned adjacent each other and wherein said feedback means include means for guiding said reference image sensor and the film relative to each other so that the transverse axis of said reference image sensor forms a right angle with the curve of its course over said film, and for moving said reference image sensor and the film longitudinally relative to each other and rotating the reference image sensor about its axis transverse to the film.

3. A device as in claim 2, wherein said guiding means includes spools for advancing and retracting the film based on the correlation results, so as to move the reference image sensor and the film longitudinally relative to each other.

4. A device as in claim 1, wherein said images are formed on a film and positioned adjacent each other and further comprising determination means coupled to the comparator means for determination of the course over said film by prior determination of the locations of the flying body in the immediate past and by a course section extrapolated into the future as well as by control instructions of the flying body.

5. A device as in claim 3, wherein said guiding means include means for measuring the relative position of the reference image sensor in relation to the film and for responding to scale divisions on the film, which divisions refer to the image content.

6. A device as in claim 1, wherein said images are formed on a film and positioned adjacent each other and wherein said reference image sensor, as well as said scene sensor 10, includes photo-diode lines, and wherein said comparator means includes respective stores for receiving the data from the lines on a line by line basis and a comparison network for comparing the contents of the stores with each other.

7. A device as in claim 6, further comprising a drift meter for the flying body and adjustment means coupled to the comparator means and responsive to the drift meter for setting said scene sensor transverse to the actual flight course.

8. A device as in claim 6, wherein said comparator means includes pitch and roll compensating means responsive to said scene sensor and an image sensor for compensation of the signals of said sensors for the pitch and roll of the flying body.

9. A device as in claim 8, further comprising determination means coupled to the comparator means for determination of the course over the film by prior determination of locations of the flying body in the immediate past and course extrapolation into the future, said determination means including means for calculating the roll and pitch of the flying body and coupled to said reference image sensor for controlling movement of the reference image sensor.

10. A device as in claims 1 to 9, wherein said comparator means includes altitude compensation means responsive to altitude signals in said flying body.

11. A device as in claim 1, wherein said images are formed on a film and positioned adjacent each other and wherein said reference image sensor includes an arrangement having a pair of film advance and film holding means and a pair of sensing devices for scanning films held by each of said film holding means, and switching means coupled to said sensing devices for switching from one of the sensing devices to the other in response to a course switching from one image to another in the two films held by said holding means.

12. A device as in claims 1, 2, 3, 4, 5, 6, 7, 8, 9, 10, or 11, wherein said feedback means includes means for guiding the reference image sensor to scan substantially transverse to the course over said film and said sensor limits the scan to a minor portion of the film transverse to the course.

* * * * *